US012682620B1

(12) United States Patent
Moschetto et al.

(10) Patent No.: US 12,682,620 B1
(45) Date of Patent: Jul. 14, 2026

(54) METHOD OF TRAINING A MACHINE LEARNING MODEL IN ORDER TO CREATE AT LEAST ONE VIRTUAL HISTOLOGICAL STAINED IMAGE

(71) Applicant: Golden Nexus, LLC, Lewes, DE (US)

(72) Inventors: Wes Moschetto, Sewickley, PA (US); Ankit Patel, Pittsburgh, PA (US); Ethan Biswell, Louisville, KY (US)

(73) Assignee: Golden Nexus, LLC, Lewes, DE (US)

( * ) Notice: Subject to any disclaimer, the term of this patent is extended or adjusted under 35 U.S.C. 154(b) by 0 days.

(21) Appl. No.: 19/413,641

(22) Filed: Dec. 9, 2025

(51) Int. Cl.
| | |
|---|---|
| *G06V 10/00* | (2022.01) |
| *G06T 11/10* | (2026.01) |
| *G06V 10/26* | (2022.01) |
| *G06V 10/46* | (2022.01) |
| *G06V 10/75* | (2022.01) |
| *G06V 10/774* | (2022.01) |
| *G06V 10/776* | (2022.01) |
| *G06V 10/82* | (2022.01) |
| *G06V 20/69* | (2022.01) |

(52) U.S. Cl.
CPC ............ *G06V 10/774* (2022.01); *G06T 11/10* (2026.01); *G06V 10/26* (2022.01); *G06V 10/462* (2022.01); *G06V 10/757* (2022.01); *G06V 10/776* (2022.01); *G06V 10/82* (2022.01); *G06V 20/695* (2022.01)

(58) Field of Classification Search
CPC .... G06V 10/774; G06V 10/26; G06V 10/462; G06V 10/757; G06V 10/776; G06V 10/82; G06V 20/695; G06T 11/10
See application file for complete search history.

(56) References Cited

U.S. PATENT DOCUMENTS

| | | | |
|---|---|---|---|
| 10,713,787 | B2 | 7/2020 | Mouton et al. |
| 11,423,256 | B2 | 8/2022 | Marie-Nelly et al. |
| 11,783,603 | B2 | 10/2023 | Stumpe et al. |
| 11,893,739 | B2 | 2/2024 | Ozcan et al. |
| 12,300,006 | B2 | 5/2025 | Ozcan et al. |
| 12,450,925 | B2 | 10/2025 | Pan et al. |
| 12,504,363 | B2 | 12/2025 | Wang et al. |
| 2020/0323480 | A1* | 10/2020 | Shaked ............... A61B 3/0025 |
| 2021/0390278 | A1 | 12/2021 | Van Leeuwen et al. |

(Continued)

FOREIGN PATENT DOCUMENTS

| | | |
|---|---|---|
| CN | 112106061 A | 12/2020 |
| CN | 111819569 B | 10/2023 |

(Continued)

OTHER PUBLICATIONS

Bai, B.et al. Deep learning-enabled virtual histological staining of biological samples. Light Sci Appl 12, 57 (2023). (Year: 2023).*

(Continued)

*Primary Examiner* — Van D Huynh
(74) *Attorney, Agent, or Firm* — The Powers IP Law Firm

(57) ABSTRACT

A method includes providing a first predetermined number of unstained tissue samples and a second predetermined number of stained tissue samples, and training a machine learning model with the first predetermined number of unstained tissue samples and the second predetermined number of stained tissue samples in order to create at least one virtual histological stained image.

19 Claims, 11 Drawing Sheets

(56)  References Cited

U.S. PATENT DOCUMENTS

| | | | |
|---|---|---|---|
| 2022/0076410 A1 | 3/2022 | Georgescu | |
| 2022/0343473 A1* | 10/2022 | Lau | G01N 1/30 |
| 2022/0375606 A1 | 11/2022 | Glass et al. | |
| 2023/0030424 A1* | 2/2023 | Ozcan | G06V 20/698 |
| 2023/0134734 A1 | 5/2023 | Freytag et al. | |
| 2023/0162410 A1* | 5/2023 | Pandey | G01N 21/6458 |
| | | | 382/128 |
| 2023/0419694 A1* | 12/2023 | Stumpe | G06V 20/69 |
| 2024/0135544 A1* | 4/2024 | Ozcan | G06N 3/096 |
| 2024/0290473 A1 | 8/2024 | Ozcan et al. | |
| 2025/0191249 A1 | 6/2025 | Loo et al. | |
| 2025/0285270 A1 | 9/2025 | Loetgering et al. | |
| 2025/0316055 A1 | 10/2025 | Yoshitake et al. | |

FOREIGN PATENT DOCUMENTS

| | | | |
|---|---|---|---|
| CN | 118096640 A | 5/2024 | |
| CN | 118096788 A | 5/2024 | |
| CN | 120014640 A | 5/2025 | |
| CN | 120457465 A | 8/2025 | |
| DE | 102024106574 A1 | 9/2025 | |
| EP | 3718046 B1 | 4/2025 | |
| JP | 2021519924 A | 8/2021 | |
| KR | 20200140301 A | 12/2020 | |
| KR | 102579826 B1 | 9/2023 | |
| KR | 102643066 B1 | 3/2024 | |
| KR | 102851169 B1 | 8/2025 | |
| WO | 2020142461 A1 | 7/2020 | |
| WO | 2021083951 A1 | 5/2021 | |
| WO | 2021198243 A1 | 10/2021 | |
| WO | 2021198244 A1 | 10/2021 | |
| WO | 2023079053 A1 | 5/2023 | |
| WO | 2024238130 A1 | 11/2024 | |
| WO | 20250101558 A1 | 5/2025 | |
| WO | 2025122842 A1 | 6/2025 | |
| WO | 2025193556 A1 | 9/2025 | |

OTHER PUBLICATIONS

Latonen, Leena et al. Virtual staining for histology by deep learning. Trends in Biotechnology, vol. 42, Issue 9, 1177-1191 (2024). (Year: 2024).*

Asaf et al., "Dual Contrastive Learning Based Image-to-Image Translation of Unstained Skin Tissue into Virtually Stained H&E Images," Scientific Reports 14.1 (2024).

Li et al., "Deep Learning for Virtual Histological Staining of Bright-Field Microscopic Images of Unlabeled Carotid Artery Tissue," Molecular Imaging and Biology 22.5 (2020) pp. 1301-1309.

Li et al., "Virtual Histological Staining of Unlabeled Autopsy Tissue," Nature Communications 15.1 (2024); 1684.

Rivenson et al., "Virtual Histological Staining of Unlabelled Tissue-Autofluorescence Images Via Deep Learning," Nature BioMedical Engineering 3.6 (2019, 466-477.

* cited by examiner

Figure 5:
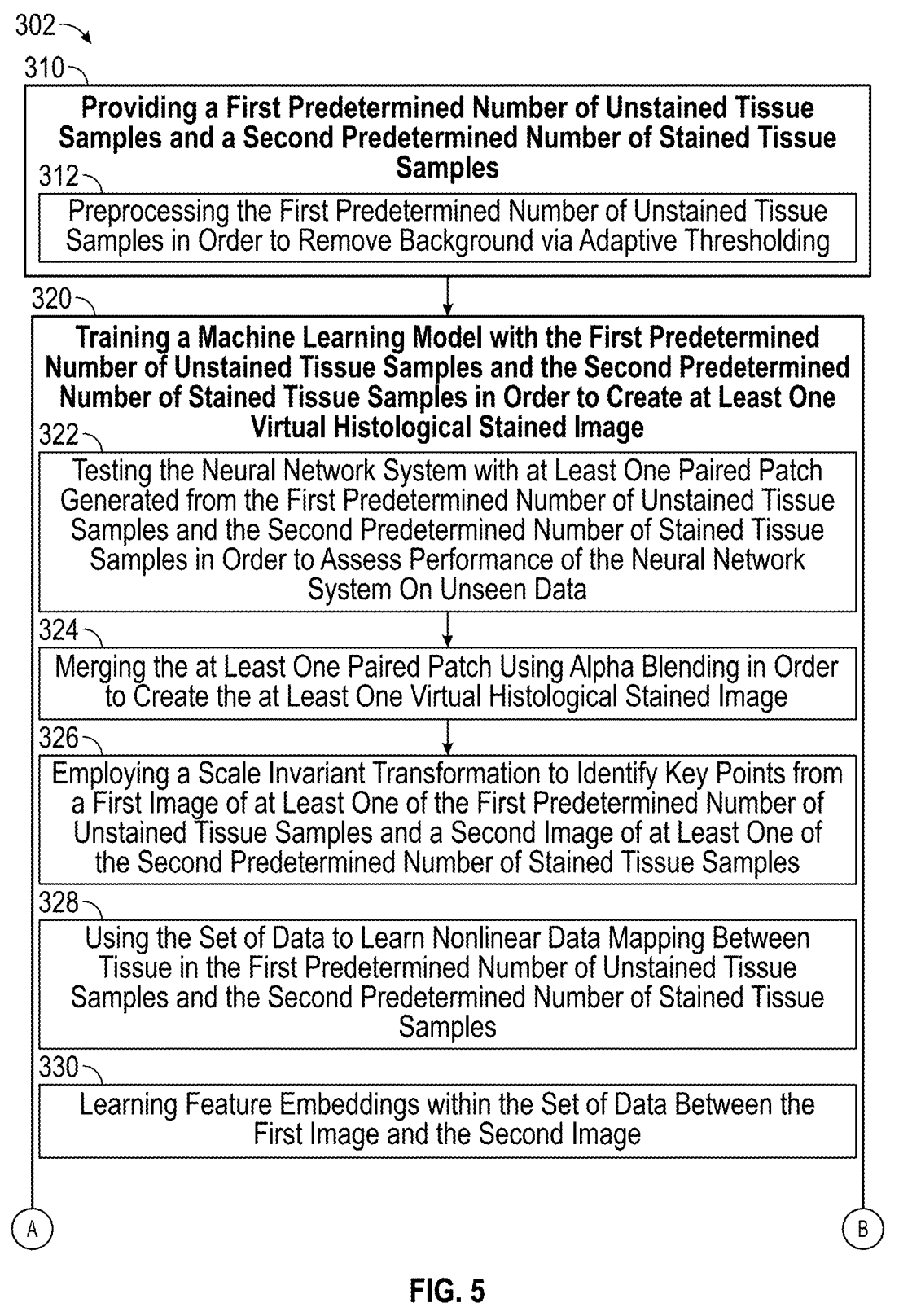

302

310

Providing a First Predetermined Number of Unstained Tissue Samples and a Second Predetermined Number of Stained Tissue Samples

312

Preprocessing the First Predetermined Number of Unstained Tissue Samples in Order to Remove Background via Adaptive Thresholding

320

Training a Machine Learning Model with the First Predetermined Number of Unstained Tissue Samples and the Second Predetermined Number of Stained Tissue Samples in Order to Create at Least One Virtual Histological Stained Image

322

Testing the Neural Network System with at Least One Paired Patch Generated from the First Predetermined Number of Unstained Tissue Samples and the Second Predetermined Number of Stained Tissue Samples in Order to Assess Performance of the Neural Network System On Unseen Data

324

Merging the at Least One Paired Patch Using Alpha Blending in Order to Create the at Least One Virtual Histological Stained Image

326

Employing a Scale Invariant Transformation to Identify Key Points from a First Image of at Least One of the First Predetermined Number of Unstained Tissue Samples and a Second Image of at Least One of the Second Predetermined Number of Stained Tissue Samples

328

Using the Set of Data to Learn Nonlinear Data Mapping Between Tissue in the First Predetermined Number of Unstained Tissue Samples and the Second Predetermined Number of Stained Tissue Samples

330

Learning Feature Embeddings within the Set of Data Between the First Image and the Second Image (A)                                                                (B)

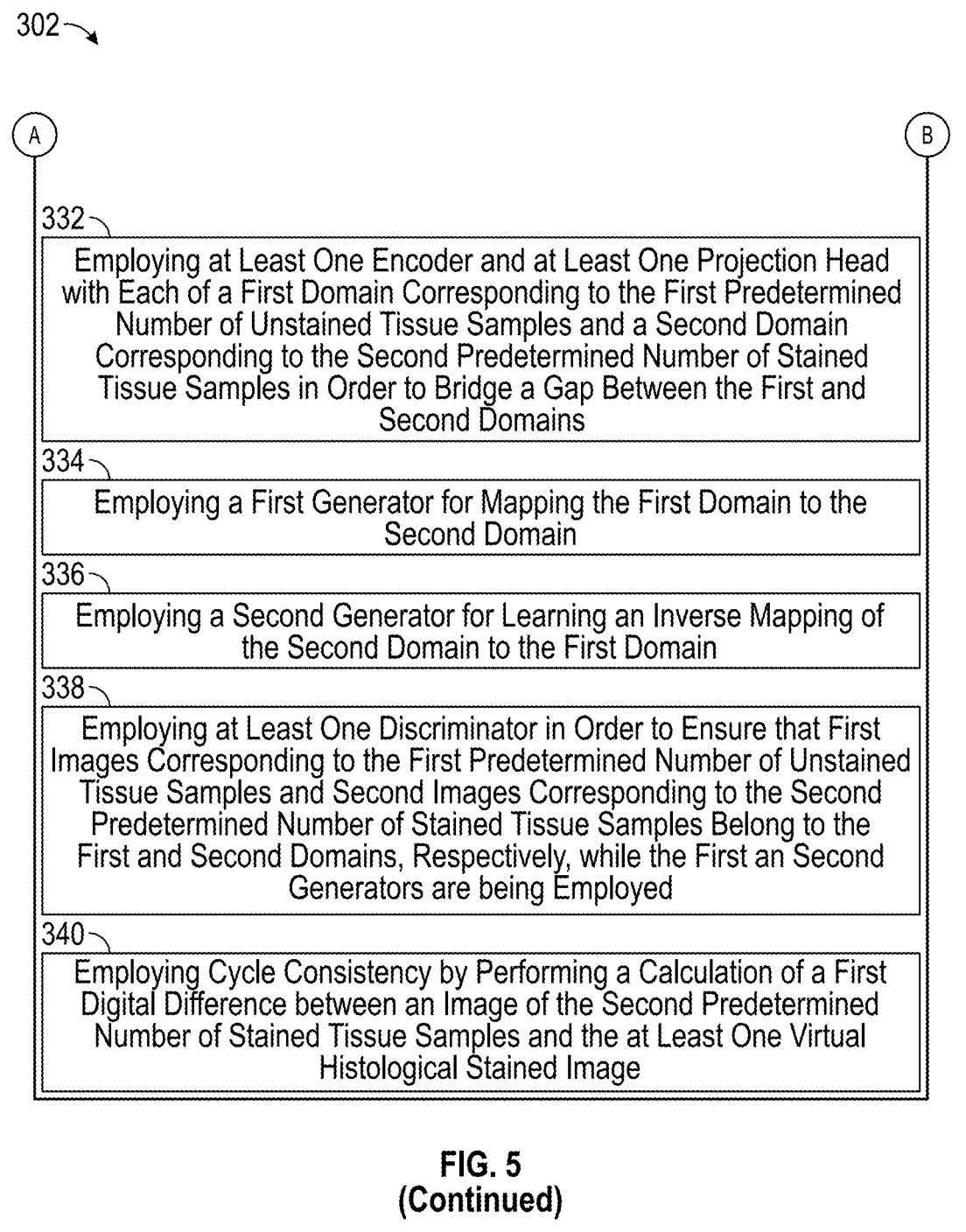

Employing at Least One Encoder and at Least One Projection Head with Each of a First Domain Corresponding to the First Predetermined Number of Unstained Tissue Samples and a Second Domain Corresponding to the Second Predetermined Number of Stained Tissue Samples in Order to Bridge a Gap Between the First and Second Domains

334

Employing a First Generator for Mapping the First Domain to the Second Domain

336

Employing a Second Generator for Learning an Inverse Mapping of the Second Domain to the First Domain

338

Employing at Least One Discriminator in Order to Ensure that First Images Corresponding to the First Predetermined Number of Unstained Tissue Samples and Second Images Corresponding to the Second Predetermined Number of Stained Tissue Samples Belong to the First and Second Domains, Respectively, while the First an Second Generators are being Employed

340

Employing Cycle Consistency by Performing a Calculation of a First Digital Difference between an Image of the Second Predetermined Number of Stained Tissue Samples and the at Least One Virtual Histological Stained Image

FIG. 5
(Continued)

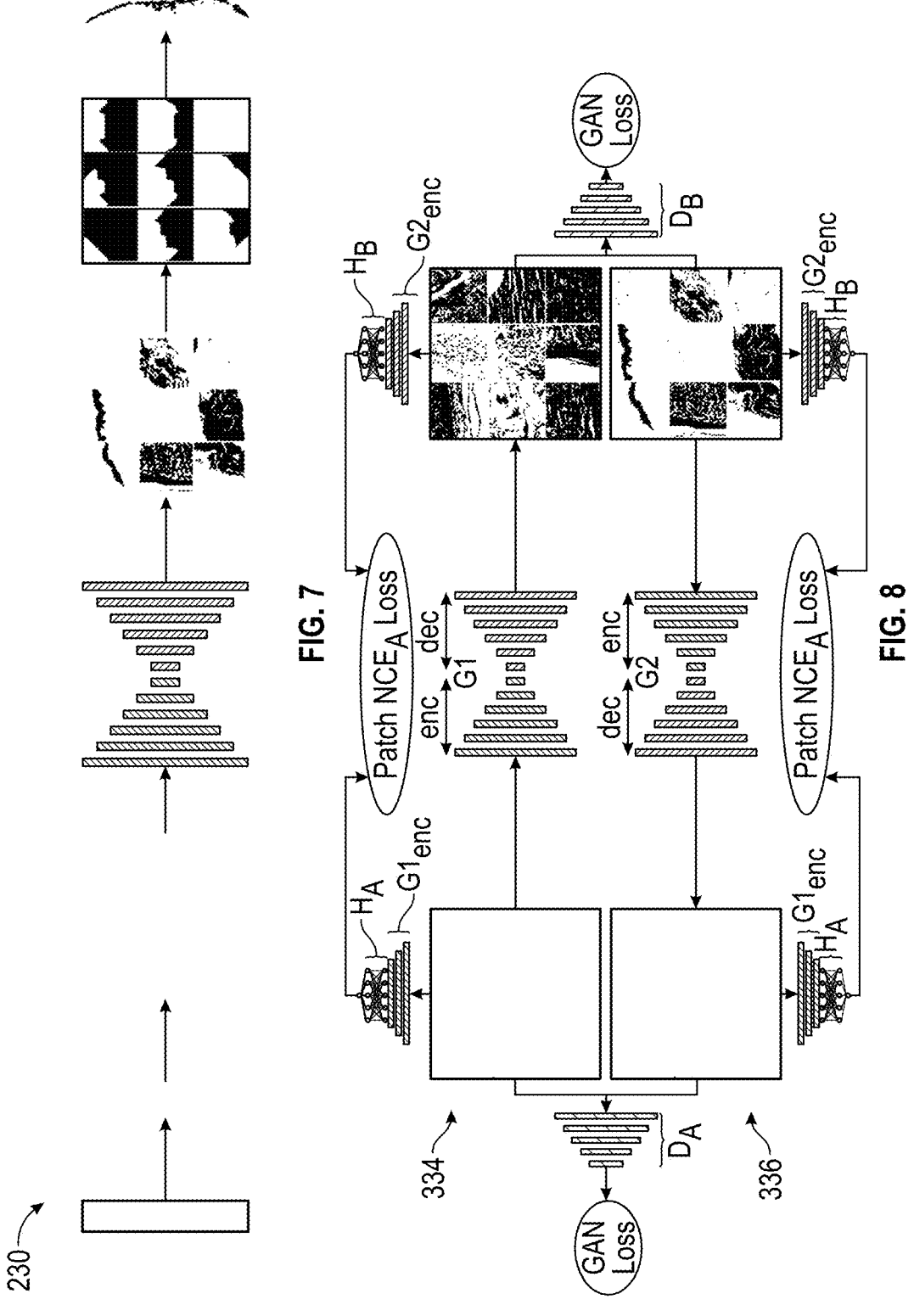

METHOD OF TRAINING A MACHINE LEARNING MODEL IN ORDER TO CREATE AT LEAST ONE VIRTUAL HISTOLOGICAL STAINED IMAGE

CROSS-REFERENCE TO RELATED APPLICATIONS

This application is related to commonly assigned, concurrently filed U.S. patent application Ser. No. 19/413,456, filed Dec. 9, 2025, and entitled "METHOD AND SYSTEM FOR CREATING A VIRTUAL HISTOLOGICAL STAINED IMAGE".

BACKGROUND OF THE INVENTION

Currently, histological workflow is time consuming and expensive, as it consumes plenty of toxic and non-toxic chemicals, water, and time for staining procedures. FIG. 1 illustrates a prior art flow chart 2 corresponding to a traditional method of histological staining. As shown in FIG. 2, the flow chart 2 provides for a first step 4 of tissue collection, a second step 6 of tissue processing, a third step 8 of embedding the tissue sample, a fourth step 10 of cutting the tissue sample, a fifth step 12 of slide preparation, a sixth step 14 of staining the tissue sample, a seventh step 16 of reviewing the stained tissue sample, and an eighth step 18 of reporting results.

Additionally, FIG. 2 shows a prior art method 22 of histological staining which employs a cryostat machine. As shown, the method 22 of FIG. 2 includes a first step 24 of providing a tissue sample, a second step 26 of embedding the tissue sample in paraffin, a third step 28 of sectioning the tissue sample in slides, a fourth step 30 of histological staining of the tissue sample, a fifth step 32 of imaging the stained tissue sample by a microscope, and a sixth step 34 using the stained tissue sample to make a diagnosis.

As can be appreciated from both FIG. 1 and FIG. 2, the current workflow in the pathology process involves many steps, including accessioning a biopsy, grossing the specimen, processing the specimen on a vacuum infiltration processor, orienting the tissue, embedding the specimen into a paraffin block, cutting relatively thin shavings (e.g., less than 20 microns in one example) of the sample on a microtome, scooping those shavings onto a slide, running that slide through a physically time extensive and expensive staining process, and then finally cover slipping the slide in order to protect the tissue. All of these steps require significant amounts of time, money, and use of chemicals, such as toxic/hazardous chemicals to be spent by the parties involved.

It is with respect to these and other considerations that the instant disclosure is concerned.

SUMMARY

In one example, a method is provided. The method comprises providing a first predetermined number of unstained tissue samples and a second predetermined number of stained tissue samples, and training a machine learning model with the first predetermined number of unstained tissue samples and the second predetermined number of stained tissue samples in order to create at least one virtual histological stained image.

It is to be understood that both the foregoing general description and the following detailed description are exemplary and explanatory and are intended to provide further explanation of the invention as claimed.

BRIEF DESCRIPTION OF DRAWINGS

FIG. 5 illustrates a method of training a machine learning model in order to create at least one virtual histological stained image, in accordance with one non-limiting embodiment of the disclosed concept.

FIG. 7 illustrates a step of the method of FIG. 4 corresponding to creating a virtual histological stained image from an image of an unstained tissue sample.

FIG. 8 illustrates method steps for the method of FIG. 5 corresponding to both employing a first generator for mapping a first domain to a second domain, and employing a second generator for learning an inverse mapping of the second domain to the first domain.

DETAILED DESCRIPTION OF THE INVENTION

In the following description, for the purposes of explanation, numerous specific details are set forth in order to provide a thorough understanding of various embodiments of the invention. As used herein, "embodiments" are non-limiting examples of apparatuses or methods employing one or more of the inventive concepts disclosed herein. It is apparent, however, that various embodiments may be practiced without these specific details or with one or more equivalent arrangements. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features of the various embodiments may be otherwise combined, separated, interchanged, and/or rearranged without departing from the inventive concepts.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "may include," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, may be used as terms of approximation and not as terms of degree, and, as such, are utilized to account for inherent deviations in measured, calculated, and/or provided values that would be recognized by one of ordinary skill in the art.

As employed herein, the term "number" shall mean one or an integer greater than one (i.e., a plurality).

Figure 3A:
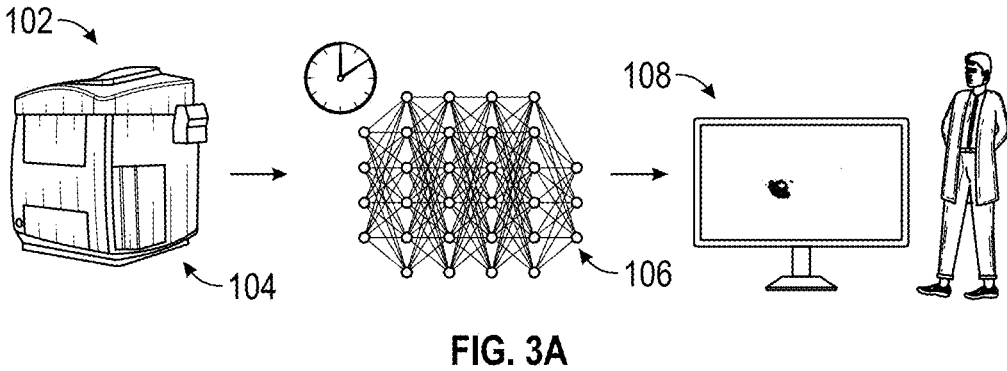
FIG. 3A illustrates a method of creating a virtual histological stained image, in accordance with one non-limiting embodiment of the disclosed concept.

FIG. 3A illustrates a method 102 of creating a virtual histological stained image, in accordance with one non-limiting embodiment of the disclosed concept. In one example, a virtual histological stained image may present with an identical or about identical stained nuclei pattern of an actual preexisting stained image that has been stained with staining solution (e.g., without limitation, hematoxylin and eosin staining, iron, gram, periodic acid-schiff (PAS), alcian blue, trichrome, gomori methenamine silver (GMS), etc.). The method 102 will be expanded upon in the following disclosure, but in one example may be stated as including a first step 104 of scanning an unstained tissue sample (e.g., without limitation, human tissue or non-human tissue such as animal tissue), a second step 106 of virtually staining the unstained tissue sample, and a third step 108 of providing a diagnosis by a user, such as a pathologist or computerized machine (e.g., without limitation, via artificial intelligence).

Figure 3B:
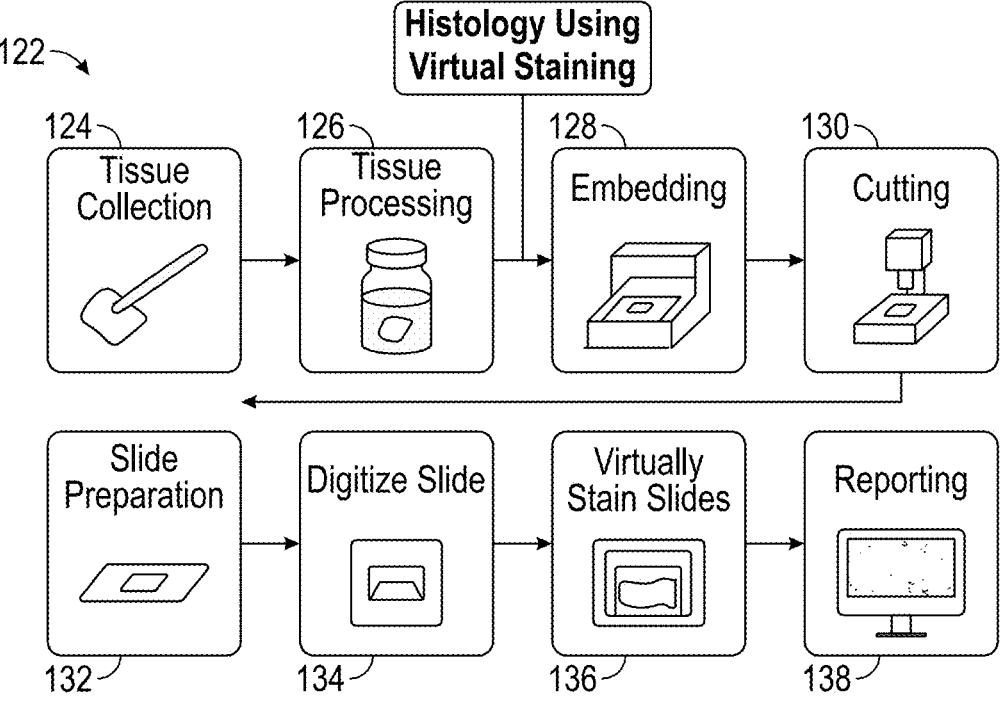
FIG. 3B illustrates a flow chart corresponding to the method of FIG. 3A.

FIG. 3B illustrates a flow chart 122 corresponding to the method 102 of FIG. 3A, and provides for a first step 124 of tissue collection, a second step 126 of tissue processing, a third step 128 of embedding, a fourth step 130 of cutting, a fifth step 132 of vehicle (e.g., without limitation, slide) preparation, a sixth step 134 of digitizing a vehicle (e.g., without limitation, slide), a seventh step 136 of virtually staining a vehicle (e.g., without limitation, slide), and an eighth step 138 of reporting a virtual histological stained image.

Figure 3C:
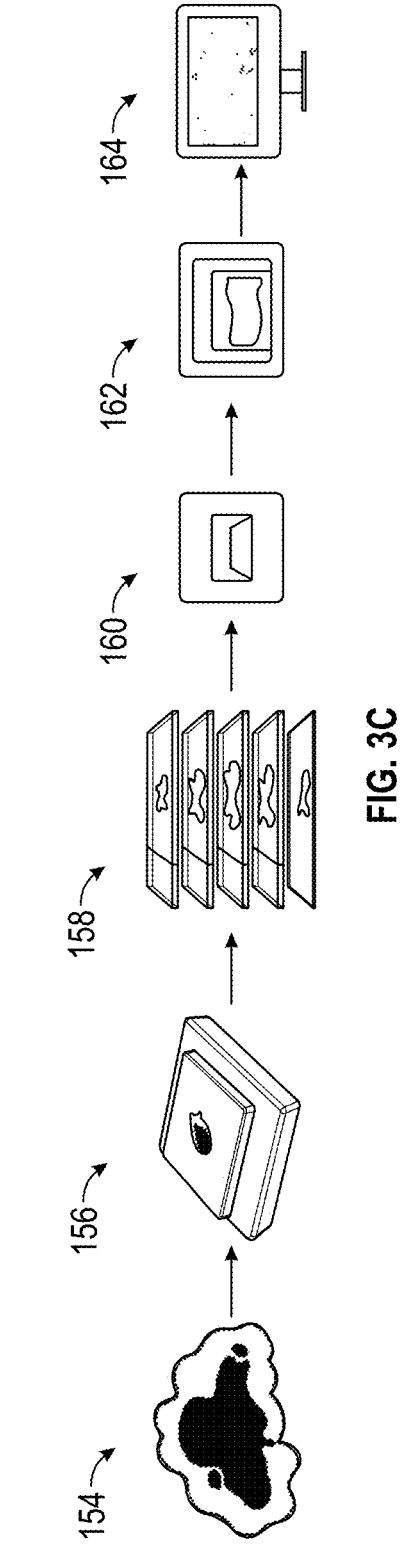
FIG. 3C illustrates a method of histological staining which employs a cryostat machine, in accordance with another non-limiting embodiment of the disclosed concept.

FIG. 3C illustrates a method 152 of histological staining which employs a cryostat machine, in accordance with another non-limiting embodiment of the disclosed concept. As shown in FIG. 3C, the method 152 includes a first step 154 of providing a tissue sample, a second step 156 of embedding the tissue sample in paraffin, a third step 158 of sectioning the tissue sample in vehicles (e.g., without limitation, slides), a fourth step 160 of digitizing a vehicle (e.g., without limitation, slide), a seventh step 162 of virtually staining vehicles (e.g., without limitation, slides), and an eighth step 164 of reporting a virtual histological stained image.

Accordingly, the inventors have developed a process to allow digital replacement of parts of the histological staining procedure. In virtual staining, in accordance with the disclosed concept, histological stains may be created by training machine learning models (e.g., without limitation, neural networks) to produce stained images from images of unstained tissue samples, and/or via transferring information from one stain to another. These technical innovations advantageously provide for a more rapid, sustainable, biohazard safe, and cost-effective alternative to the prior art histological pipelines of FIGS. 1 and 2, and do so in one example by virtually replicating the images of chemically stained tissue samples using only the microscopic images of unstained samples, thereby completely eliminating the need for chemical staining procedures.

In one example embodiment of the disclosed concept, after a laboratory places an unstained tissue sample onto a vehicle (e.g., without limitation, slide), a user may scan that unstained vehicle, and an algorithm may digitally create a large plurality of stains via the selection of a button (e.g., without limitation, mouse click or other computerized selection), thereby providing the user with hundreds of different pertinent stains instantaneously.

Figure 1:
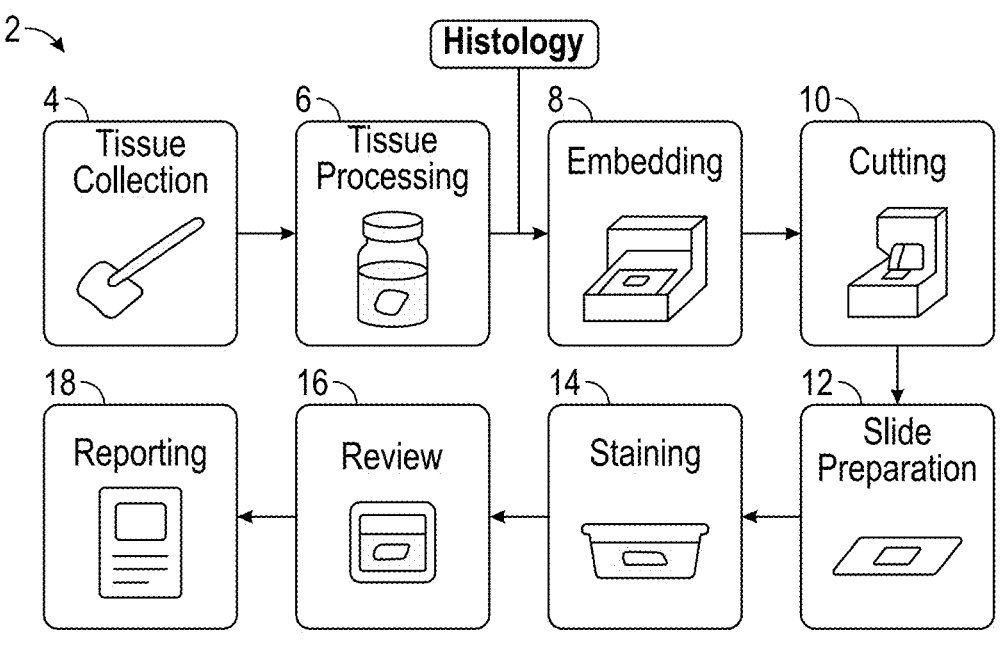
FIG. 1 illustrates a flow chart corresponding to a traditional method of histological staining.
Figure 2:
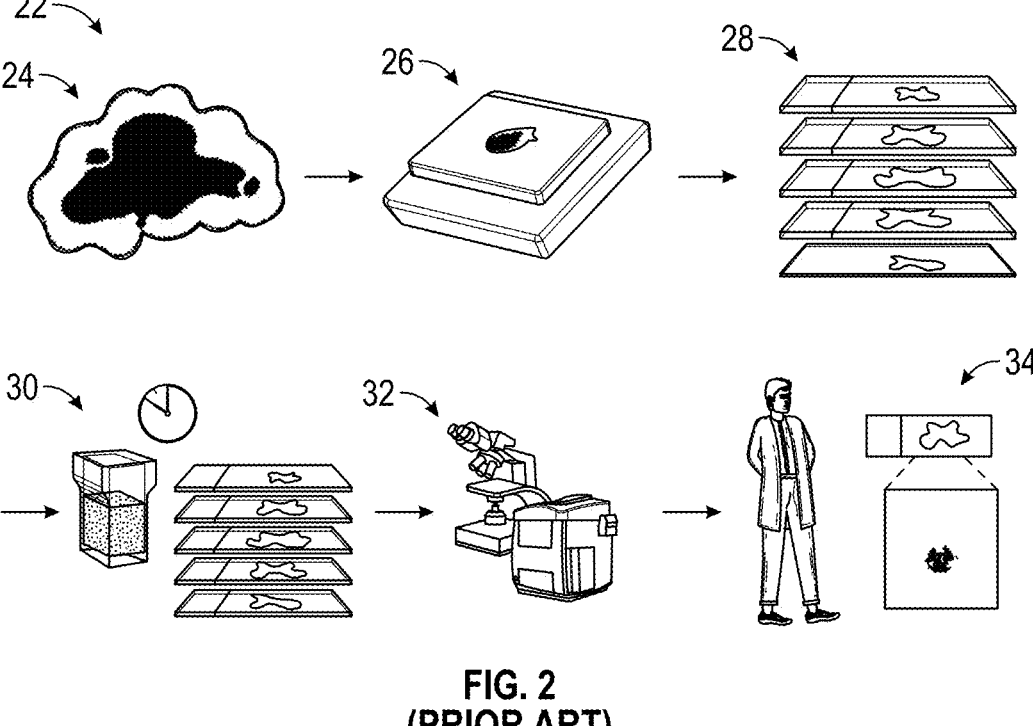
FIG. 2 illustrates a prior art method of histological staining which employs a cryostat machine.

Accordingly, virtual staining in accordance with the disclosed concept may offer a promising alternative for processing unstained samples that is cheaper, faster, safer, and more consistent than traditional staining. It may also reduce the time, labor and cost of tissue staining, as it does not require certain specialized equipment, reagents, or personnel. Another advantage is that virtual staining advantageously preserves the actual tissue sample, whereas the prior art method and workflow of FIGS. 1 and 2 is destructive in nature such that most of the time the stained tissue sections cannot be used for further analysis. Virtual staining in accordance with the disclosed concept may also avoid the use of non-toxic chemicals, as well as harmful and toxic chemicals which are common in traditional staining, such as, for example and without limitation, formalin, ethanol, xylene, clarifier, acid alcohol, ammonium hydroxide, hematoxylin and eosin. Furthermore, deep learning based virtual staining advantageously provides results more rapidly, compared to the traditional manual staining process that can take up to several hours. Accordingly, virtual staining in accordance with the disclosed concept offers several benefits over the prior art depicted in FIGS. 1 and 2.

Figure 4:
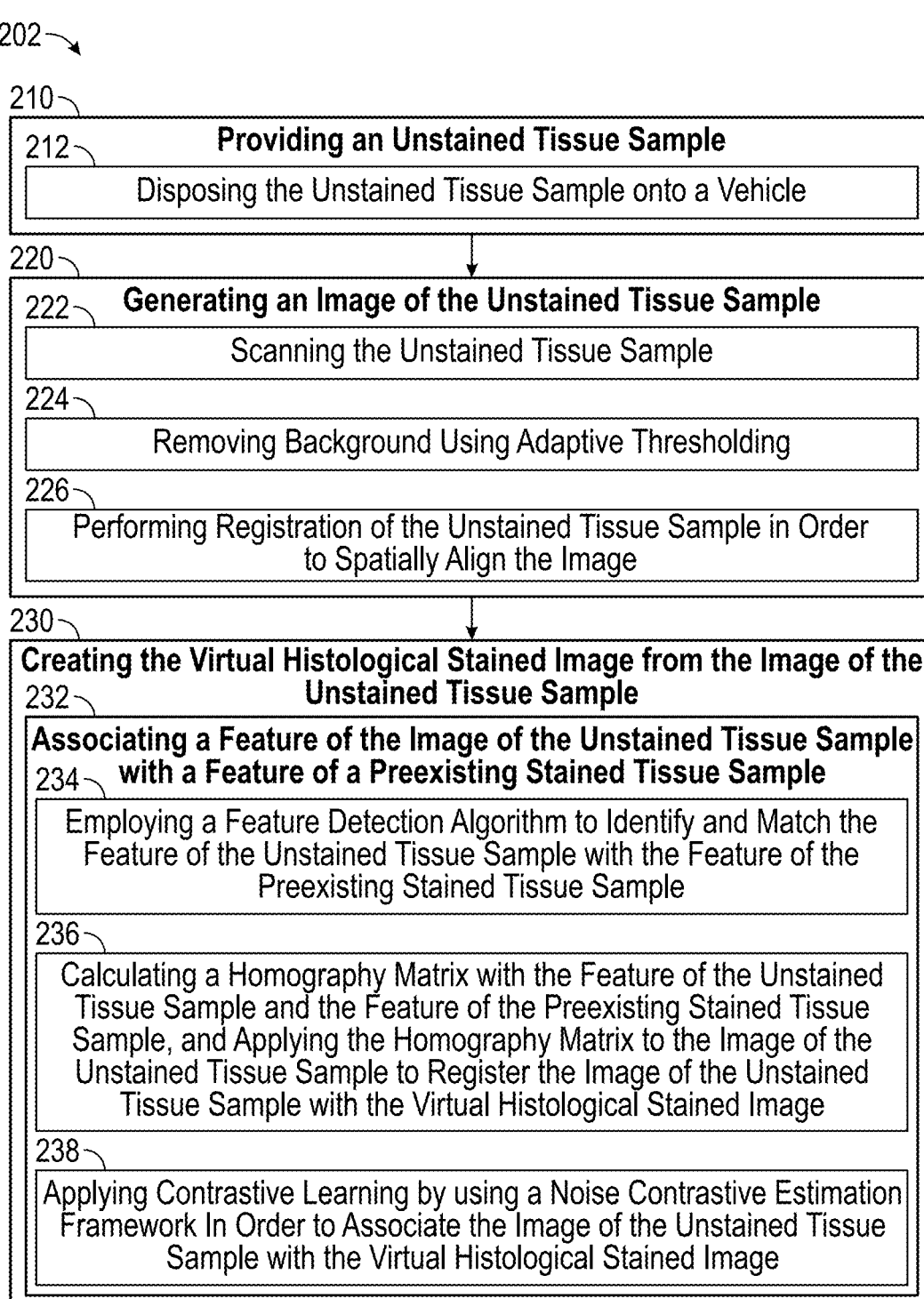
FIG. 4 illustrates a method of creating a virtual histological stained image corresponding to part or all of FIGS. 3A-3C, in accordance with one non-limiting embodiment of the disclosed concept.

FIG. 4 illustrates a method 202 of creating a virtual histological stained image corresponding to part or all of FIGS. 3A-3C, in accordance with one non-limiting embodiment of the disclosed concept. In one example, the method 202 includes a first step 210 of providing an unstained tissue sample, a second step 220 of generating an image (e.g., without limitation, a microscopic image which may optionally be a microscopic digital image) of the unstained tissue sample, and a third step 230 of creating the virtual histological stained image from the image of the unstained tissue sample. The entire disclosed method 202 may be performed in less than 10 minutes time in one example, and in another example may be performed in less than one minute. Furthermore, the third step 230 of creating the virtual histological stained image may be performed without chemical modification to the unstained tissue sample. Thus, the disclosed method 202 advantageously provides a fast and reliable way to generate a virtual histological stained image, and does so while preserving the underlying unstained tissue sample.

In one example, the unstained tissue sample may have a first nuclei pattern, and the image of the unstained tissue sample and the virtual histological stained image may both have second and third nuclei patterns based on the first nuclei pattern, such as being shaped substantially the same and/or the same as the first nuclei pattern. The disclosed method 202 may contemplate generating the image of the unstained tissue sample directly from the unstained tissue sample, and may also contemplate that the first step 210 includes a step 212 of disposing the unstained tissue sample onto a vehicle (e.g., without limitation, a slide such as a positively charged slide, or other vehicle such as a piece of material made of a monomeric, polymeric, or mixture thereof material like plastic), and then performing the second step 220 of generating the image of the unstained tissue sample. As shown in FIG. 4, it will be appreciated that generating the image of the unstained tissue sample may include a step 222 of scanning the unstained tissue sample (e.g., without limitation, by employing a digital scanner), a step 224 of removing background using adaptive thresholding, and a step 226 of performing registration of the unstained tissue sample in order to spatially align the image of the unstained tissue sample.

Figure 9:
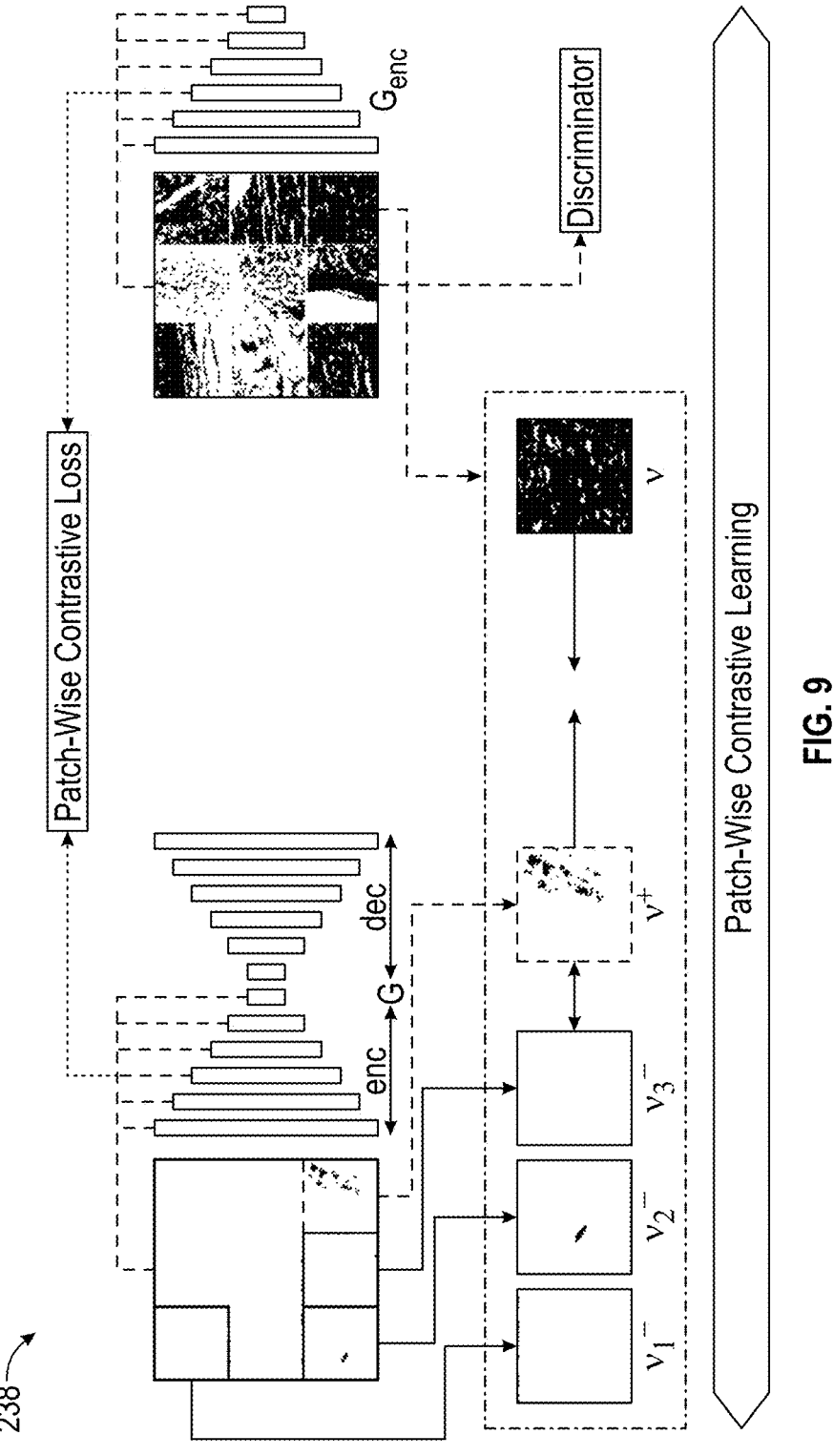
FIG. 9 illustrates a method step for the method of FIG. 4 corresponding to applying contrastive learning by using a noise contrastive estimation framework in order to associate the image of the unstained tissue sample with the virtual histological stained image.

Continuing to refer to FIG. 4, the third step 230 of creating the virtual histological stained image may include a step 232 of associating a feature (e.g., without limitation, nuclei) of the image of the unstained tissue sample with a feature (e.g., without limitation, nuclei) of a preexisting stained tissue sample. In one example, the step 232 of associating the feature may include a step 234 of employing a feature detection algorithm to identify and match the feature of the unstained tissue sample with the feature of the preexisting stained tissue sample, a step 236 of calculating a homography matrix with the feature of the unstained tissue sample and the feature of the preexisting stained tissue sample, and applying the homography matrix to the image of the unstained tissue sample to register the image of the unstained tissue sample with the virtual histological stained image, and a further step 238 (also shown in FIG. 9) of applying contrastive learning by using a noise contrastive estimation framework in order to associate the image of the unstained tissue sample with the virtual histological stained image. The third step 230 is also depicted in FIG. 7, and is generally illustrated in a manner such that an inference may be made by machining learning models in accordance with the disclosed concept to translate images of unstained tissue samples into virtual histological stained images.

In order to perform the method 202 of FIG. 4, the disclosed concept is advantageously configured to employ a machine learning model (e.g., without limitation, a neural network system, and more particularly a dual contrastive learning general adversarial network ("DCLGAN") model) to translate unstained tissue samples, such as unstained tissue samples located on vehicles (e.g., without limitation, slides) or not located on vehicles, into virtually generated histological stained images.

In one example, and referring to FIG. 8, a DCLGAN model may include two generators G1,G2, two discriminators DA,DB, and a first multilayered perceptron module having two layers $G1_{enc}$, HA and a second multilayered perceptron module having two layers $G2_{enc}$, HB, in order to get featured embeddings. The generators G1, G2 may be responsible for mapping images from one domain to another, such as from unstained tissue to tissue that has been stained with staining solution. The discriminators DA,DB may be responsible for distinguishing between real and fake images in each domain. The two layers $G1_{enc}$, HA of the first multilayered perceptron module and the two layers $G2_{enc}$, HB of the second multilayered perceptron module may be responsible for learning the correspondence between input and output image patches using separate embeddings.

In one example, the disclosed machine learning model may employ distinct encoders and projection heads for each domain, thereby allowing for better learning of domain specific representations and effectively bridging a domain gap. Doing so may allow for accurate image translation. Accordingly, it will be appreciated that the disclosed dual learning setting where both forward and backward image-to-image translations are performed may help stabilize the training process and reach convergence. Additionally, by using different encoders and projection heads for different domains, the disclosed machine learning model may advantageously be configured to learn suitable embeddings to maximize mutual information. The dual learning setting may also help in stabilizing model training.

FIG. 5 illustrates a method 302 of training the abovementioned machine learning model to create at least one virtual histological stained image, in accordance with one non-limiting embodiment of the disclosed concept. In one example, the method 302 may include a first step 310 of providing a first predetermined number (e.g., without limitation, pairs) of unstained tissue samples and a second predetermined number (e.g., without limitation, pairs) of stained tissue samples, and a second step 320 of training a machine learning model with the first predetermined number of unstained tissue samples and the second predetermined number of stained tissue samples in order to create at least one virtual histological stained image. It will be appreciated that once the second step 320 is performed, the trained model may be applied in an inference stage (FIG. 7) in order to generate virtual stained patches from unstained patches.

Figure 6:
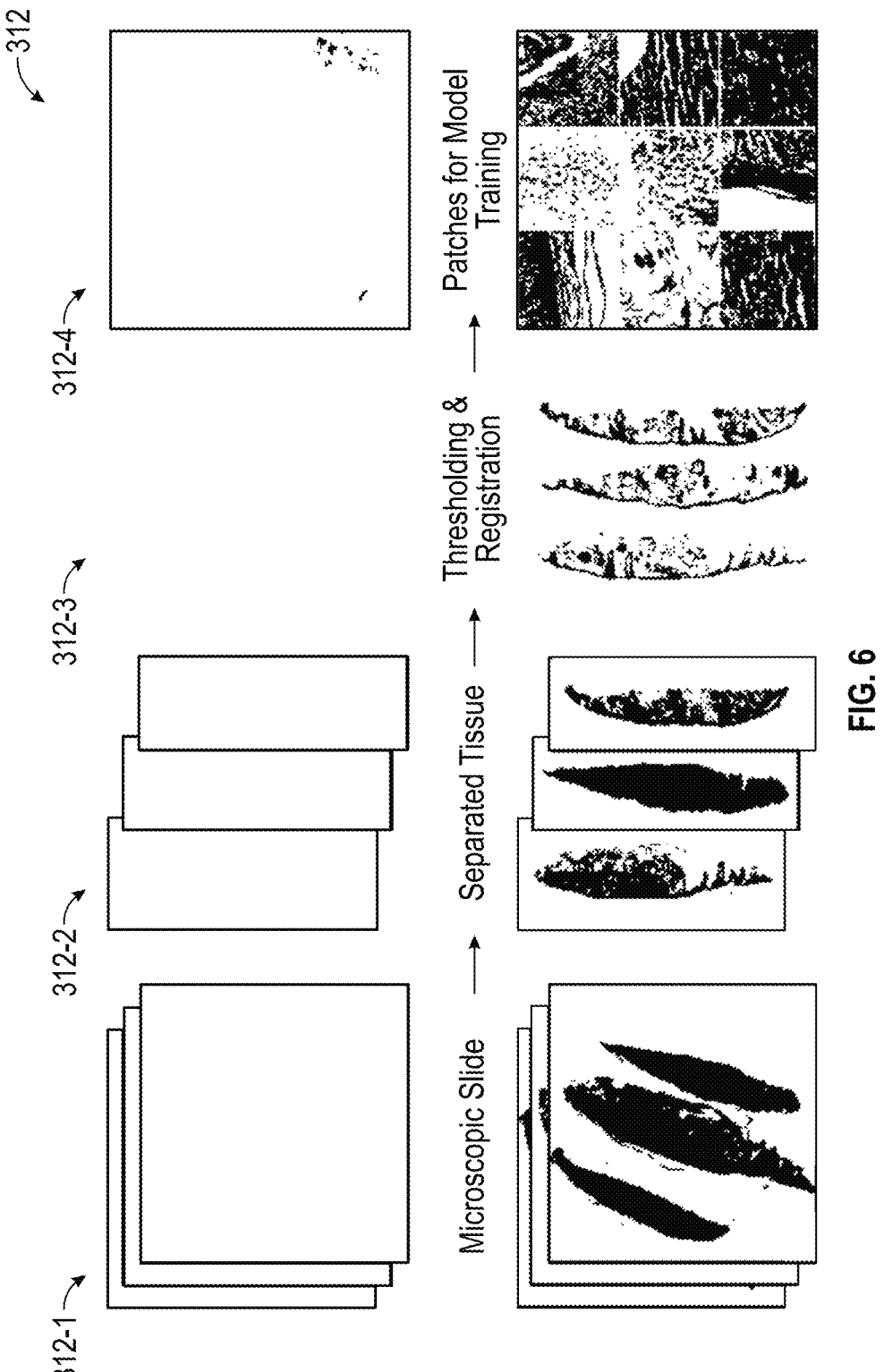
FIG. 6 illustrates a step of the method of FIG. 5 corresponding to preprocessing of unstained tissue samples.

The first step 310 of the method 302 of FIG. 5 may include a step 312 of preprocessing the first predetermined number of unstained tissue samples in order to remove background via adaptive thresholding. The step 312 is also depicted in FIG. 6, and is depicted with various stages of preprocessing corresponding to providing microscopic vehicles (e.g., without limitation, slides) 312-1, separating tissue 312-2, thresholding and registration 312-3, and providing patches for model training 312-4.

As mentioned above, the disclosed concept contemplates that the machine learning model may be a neural network system. Accordingly, once the patches are provided for according to FIG. 6, the second step 320 may include a step 322 of testing the neural network system with at least one paired patch generated from the first predetermined number of unstained tissue samples and the second predetermined number of stained tissue samples in order to assess performance of the neural network system on unseen data.

In one example, a dataset may be employed to train such a virtual staining machine learning model (e.g., neural network system), wherein said dataset may include between 50-150 pairs (e.g., without limitation, between 85-100 pairs) of unstained and stained preexisting tissue vehicles (e.g., skin tissue slides). In one example, images may be scanned at a relatively high magnification (e.g., without limitation, at least 20× magnification) using a standard microscope (e.g., without limitation, a brightfield microscope), wherein each image may be divided into predetermined sized (e.g., without limitation, 512×512 pixel) patches with a predetermined (e.g., without limitation, 256 pixel) overlap between consecutive patches. Using these vehicles, a large number (e.g., more than 40,000) of paired patches from unstained and stained images may be generated.

In one example, whenever these patches have plain background, they may be excluded to ensure optimal data quality and relevance. After this refinement process, a large amount (e.g., more than 13,000) of usable patches may be obtained. Out of these, another large amount (e.g., around 11,000) of patches may be allocated for model training, providing a substantial dataset for the model to learn from. The remaining patches may be used for testing, thereby allowing for an assessment of the model's performance on unseen data. In one example, such a partitioning process may result in a balanced training and testing data split of nearly 80:20.

It will also be appreciated that the second step 320 of training the machine learning model may include a step 324 of merging at least one paired patch using alpha blending in order to create the virtual histological stained image, and a step 326 of employing a scale invariant transformation to identify key points (e.g., without limitation, nuclei) from a first image of at least one of the first predetermined number of unstained tissue samples and a second image of at least one of the second predetermined number of stained tissue samples. Employing a scale invariant transformation in accordance with the disclosed concept may include matching the key points of the first image to the key points of the second image in order to calculate a homography matrix, and applying the homography matrix to the first image in order to register the first image with the second image and create a set of data. It follows that the second step 320 may further include a step 328 of using the set of data to learn nonlinear data mapping between tissue in the first predetermined number of unstained tissue samples and the second predetermined number of stained tissue samples, and a step 330 of learning feature embeddings within the set of data between the first image and the second image.

In one example the second step 320 may further include a step 332 of employing at least one encoder and at least one projection head with each of a first domain corresponding to the first predetermined number of unstained tissue samples and a second domain corresponding to the second predetermined number of stained tissue samples in order to bridge a gap between the first and second domains, and additional steps 334,336 of employing a first generator G1 (FIG. 8) for mapping the first domain to the second domain, and employing a second generator G2 (FIG. 8) for learning an inverse mapping of the second domain to the first domain, respectively.

As shown in FIG. 8, the steps 334,336 may correspond to an architecture of the machine learning model (e.g., neural network system) of the disclosed concept, which shows two learning maps, first from a first domain to a second domain via a first generator G1, and second from the second domain back to the first domain via a second generator G2. In one example, the encoded half of the first and second generators G1, G2 may be labeled as $G1_{enc}$ and $G2_{enc}$, respectively, wherein $G1_{enc}$ and HA (the two layers of the first multilayered perceptron module) serve as the embedding for A, while $G2_{enc}$ and HB (the two layers of the second multilayered perceptron module) serve as the embedding for B. Accordingly, the disclosed machine learning model, which may be a neural network system, and more particularly may be a dual contrastive learning GAN model, may learn a correspondence between images of the first predetermined number of unstained tissue samples and images of the second predetermined number of stained tissue samples using separated embeddings.

Referring again to FIG. 5, the second step 320 may further includes a step 338 of employing at least one discriminator in order to ensure that first images corresponding to the first predetermined number of unstained tissue samples and the second images corresponding to the second predetermined number of stained tissue samples belong to the first and second domains, respectively, while the first and second generators G1,G2 (FIG. 8) are being employed. It will also be appreciated that the second step 320 of training the machine learning model may include a step 340 of employing cycle consistency by performing a calculation of a first digital difference between an image of the second predetermined number of stained tissue samples and at least one virtual histological stained image. Furthermore, the cycle consistency may be employed to perform another calculation of a second digital difference between the virtual histological stained image and the image of the second predetermined number of stained tissue samples in order to cause the histological stained image to be identical to the first image.

Accordingly, the machine learning model in accordance with the disclosed concept may develop an unsupervised image-to-image translation model that builds on the strengths of a CycleGAN model and Contrastive Unpaired Translation ("CUT") protocol. CycleGAN models in accordance with the disclosed concept may uses cycle consistency to train a machine learning model, which involves calculating the difference between an original image of a first domain and an image obtained after transforming the first domain image to a second domain, and then back to the first domain. This approach may force original and reconstructed images to be identical.

In one example, a DCLGAN model in accordance with the disclosed concept may use contrastive learning to maximize mutual information between the input and generated images. Contrastive learning in CUT may learn feature embeddings where linked and related features are brought closer to each other in contrast to other samples that were used in a given dataset. As a result, maximizing mutual information by learning a cross-domain similarity function in accordance with the disclosed concept may generate precise results, and DCLGAN models in accordance with the disclosed concept may improve CUT by extending the learning of one side mapping to learning two-sided mappings across the domains. In one example, by learning two-sided mapping in CycleGAN, the performance in learning embeddings may be improved, and better results may be achieved in terms of image translation.

In one example, mutual information may be maximized between input and output image patches, wherein a patch showing an unstained tissue feature (e.g., a nuclei of a human or non-human tissue) with a particular identifying texture may associate closely and more strongly with a similar stained tissue feature having a similar texture. As a result, the generated images may advantageously look like the input used to generate it instead of resembling random images from the dataset. Furthermore, contrastive learning may be applied by using a noise contrastive estimation framework in order to associate the two given image patches. The first image patch may be a query, and may be taken from the generated output, and compared with an input image patch taken from the same location. In one non-limiting example, the second image patch may be a positive example, and the negative image patches may be taken from the same image but from different coordinate positions from the positive example, where N is the number of negative patches.

Figure 10:
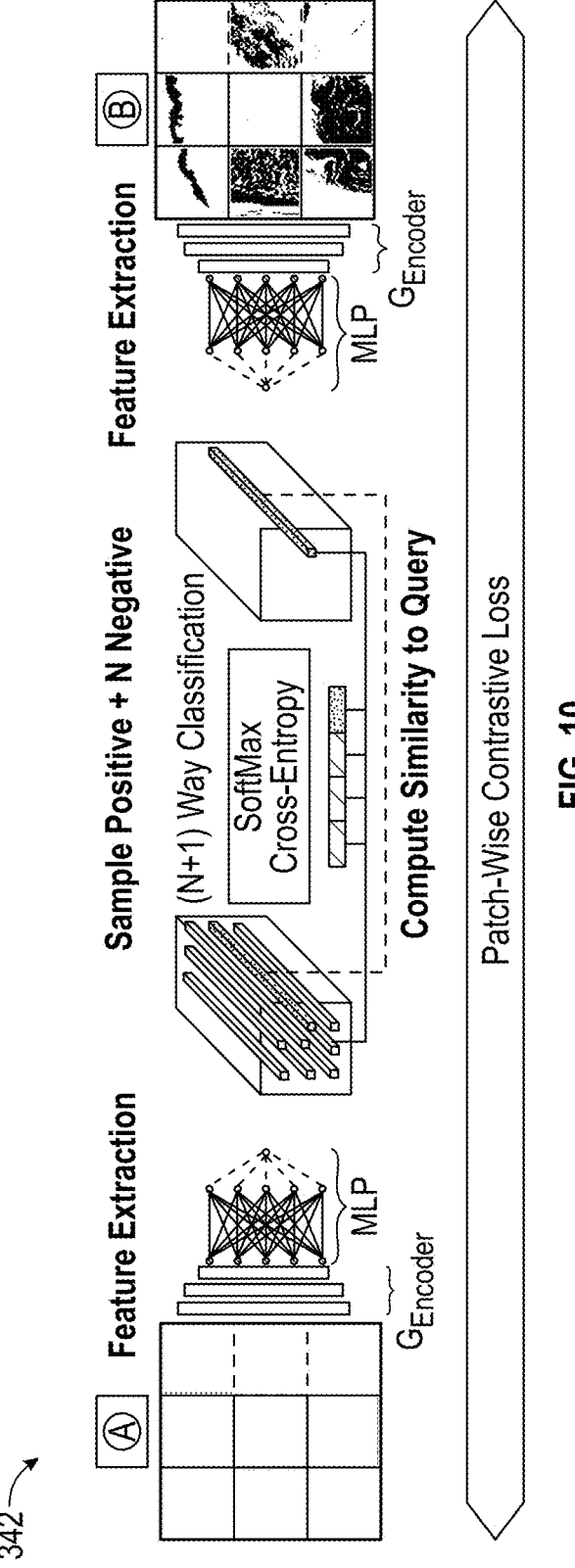
FIG. 10 illustrate a workflow explaining a process of patch-wise contrastive loss that may be employed by the disclosed concept in order to increase a similarity between real and generated patches.

In one example, and with reference to FIG. 10, query, positive, and negative patches may be mapped as K dimensional vectors and be represented with v. v+ $\in R^k$ and v- $\in R^{n \times k}$ respectively. v$-^n \in R^k$ indicates nth negative value. This may be simplified as an (N+1) classification problem performed after normalizing vectors using L2 normalization. As such, a likelihood of selecting the positive example against negatives may be calculated and represented mathematically as cross entropy loss, as represented below in Equation 1:

$$\updownarrow(v, v^+, v^-) = \qquad \text{Equation 1}$$

$$-\log\left[\frac{\exp(\text{sim}(v, v^+)/\tau)}{\exp(\text{sim}(v, v^+)/\tau) + \sum_{n=1}^{N}\exp(\text{sim}(v, v_n^-)/\tau)}\right]$$

In Equation 1, the expression $\text{sim}(u,v)=u^T v/\|u\|\|v\|$ may represent cosine similarity between the object u and v, and $\tau$ may represent a temperature parameter that scales the distance between v, $v^+$ & $v^-$.

Accordingly, the architecture of disclosed DCLGAN model may include three distinct loss functions that guide training of the model in step 320. These loss functions may be adversarial loss, identity loss and patch NCE loss. In one example, patch noise contrastive estimation loss may be used where $G1_{enc}$ and HA extract features from domain A and $G2_{enc}$; and HB extract features from domain B. Layers L from $G1_{enc}$ A may be sent to HA, which may embed one image to a stack of features according to Equation 2, represented below:

$$\{z1\}L = \{H^1 A(G1^1 enc(a)\}L \qquad \text{Equation 2}$$

where $G1\ ^1enc$ denotes the output of L-th selected layers. The image patches may make up the stack of features extracted from the image, and each patch may represent an individual feature present at locations s in layers L. This may be expressed as a set $s \in \{1, \ldots, S1\}$, where S1 is the total number of spatial locations in every layer. Every query patch with its corresponding positive feature and its location may be represented as $z^s1 \in R^C1$. All other features designated as negative in layers L may be expressed as $z^{S/s}\ 1 \in R^{(S1-1) \times C1}$, where C1 may represent a total number of color channels in each layer. For the generated image G1(a) belonging to domain B, dual learning may be used to learn a different embedding of domain B to get another set of features, according to Equation 3, represented below:

$$\{z1\}L = \{G2^1 Y(G2^1 enc(G1(a)))\}L. \qquad \text{Equation 3}$$

FIG. 10 illustrate a workflow 342 explaining a process of patch-wise contrastive loss that may be employed by the disclosed concept in order to increase a similarity between real and generated patches. Additionally, in one example, a patch-wise multilayered patch noise estimation loss for mapping a first domain onto a second domain with a first generator (G1: A→B) may be stated below as Equation 4:

$$\mathcal{L}_{PatchNCE_A}(G1, H_A, H_B, A) = \mathbb{E}_{a \sim A}\sum_{l=1}^{L}\sum_{s=1}^{S_l}\ell(\hat{z}_l^s, z_l^s, z_l^{S \backslash s}) \qquad \text{Equation 4}$$

Furthermore, it will be appreciated that learning the reverse mapping patch NCE loss for mapping the second domain back onto the first domain with a second generator (G2: B→A) may be stated below as Equation 5:

$$\mathcal{L}_{PatchNCE_B}(G2, H_A, H_B, B) = \mathbb{E}_{b \sim B}\sum_{l=1}^{L}\sum_{s=1}^{S_l}\ell(\hat{z}_l^s, z_l^s, z_l^{S \backslash s}) \qquad \text{Equation 5}$$

where $$\{z_l\}_L = \{G2_B^l(G2_{enc}^l(b))\}_L \text{ and } \{\hat{z}_l\}_L = \{G2_A^l(G1_{enc}^l(G2(b)))\}_L;$$

are different from those of Equation 4.

Furthermore, in one example adversarial loss may be employed to generate realistic images with similar visual appearances to ground truth images. Two generators G1,G2 may be employed for learning two inverse mappings across the domains, which may correspond to two different adversarial losses. In one example, a loss function for mapping G1: A→B using discriminator DB may be represented by Equation 6:

$$\mathcal{L}_{GAN}(G1, D_B, A, B) = \qquad \text{Equation 6}$$

$$\mathbb{E}_{b \sim B}[\log(D_B(b))] + \mathbb{E}_{a \sim A}[\log(1 - D_B(G1(a))]$$

Regarding Equation 6, G1 may be configured to generate images G1(a) that are similar in appearance to images of domain B; and discriminator $D_B$ may differentiate between generated images G1(a) and real images of domain B. The loss function for mapping G2: B→A using discriminator DA may be provided as Equation 7:

$$\mathcal{L}_{GAN}(G2, D_A, A, B) = \qquad \text{Equation 7}$$

$$\mathbb{E}_{a \sim A}[\log(D_A(a))] + \mathbb{E}_{b \sim B}[\log(1 - D_A(G2(b))]$$

Additionally, in one example the tracking of identity loss may be employed in order to ensure that the generators G1,G2 (FIG. 8) do not make unreasonable variations while generating image patches. This may include identity loss while in the learning model to help to preserve color in generated images. Identity loss may be represented as Equation 8:

$$\mathcal{L}_{identity}(G1, G2,) = \mathbb{E}_{a \sim A}[\|G2(a) - a\|_1] + \mathbb{E}_{b \sim B}[\|G1(b) - b\|_1] \qquad \text{Equation 8}$$

In one example, an objective of using a machine learning model such as a DCLGAN model may be to generate realistic looking stained images from unstained tissue samples, while keeping correspondence between both histological domains unstained (A) and stained (B). This may be expressed using a collective loss function, represented below as Equation 9:

$$\lambda_{GAN}(\mathcal{L}_{GAN}(G1, D_B, A, B) + \mathcal{L}_{GAN}(G2, D_A, A, B)) + \qquad \text{Equation 9}$$

$$\mathcal{L}(G1, G2, D_A, D_B, H_A, H_B) =$$

$$\lambda_{NCE}\mathcal{L}_{Patch\ NCE_A}(G1, H_A, H_B, A) +$$

$$\lambda_{NCE}\mathcal{L}_{Patch\ NCE_B}(G2, H_A, H_B, B) + \lambda_{idt}\mathcal{L}_{identity}(G1, G2)$$

Figure 11:
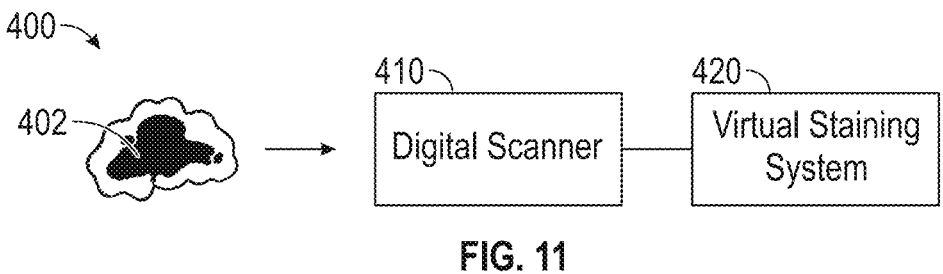
FIG. 11 illustrates a simplified drawing of a system for creating a virtual histological stained image from an unstained tissue sample, and shown as employed with the unstained tissue sample, in accordance with one non-limiting embodiment of the disclosed concept.

FIG. 11 shows a system 400 for creating a virtual histological stained image from an unstained tissue sample 402, in accordance with one non-limiting embodiment of the disclosed concept. In one example, the system 400 may include a digital scanner 410 configured to acquire an image of the unstained tissue sample 402, and a virtual staining system 420 communicatively coupled to the digital scanner 410 and configured to receive the image of the unstained tissue sample 402 and generate the virtual histological stained image from the image of the unstained tissue sample 402. In one example, the digital scanner 410 may be configured to acquire the image of the unstained tissue sample 402 as a digital image (e.g., without limitation, a high-resolution, brightfield digital image). Furthermore, it will be appreciated that the virtual staining system 420 may be configured to receive the image of the unstained tissue sample 402 from the digital scanner 410 via at least one of a universal serial bus port upload, a direct online download, and a cloud platform upload, and then create the virtual histological stained image pursuant to method steps discussed above.

In one example, digital vehicle scanning with the digital scanner 410 may allow for loading of prepared vehicles into the digital scanner 410, acquiring high-resolution, brightfield images of the unstained sections, and exporting or downloading of the resulting digital vehicle files for processing. It is also contemplated that the tissue sample 402 may be loaded into the digital scanner 410 and scanned to generate an image without first being provided onto a vehicle.

Additionally, in one example, accessing virtual staining software with the virtual staining system 420 may be achieved via a universal serial bus port upload, a direct online download, and/or a cloud platform upload (e.g., without limitation, via an internet access). Moreover, virtual staining via the virtual staining system 420 may include performing computational staining to generate virtually stained images and/or vehicle, as well as exporting of the stained images for review, diagnostics, or downstream analysis. Furthermore, it is also contemplated that the digital scanner 410 and the virtual staining system 420 may be a single unitary device with a common operating system (e.g., a common processor or processors to perform instructions (e.g., corresponding to the method 202 in FIG. 4) stored in a common memory).

Figure 12:
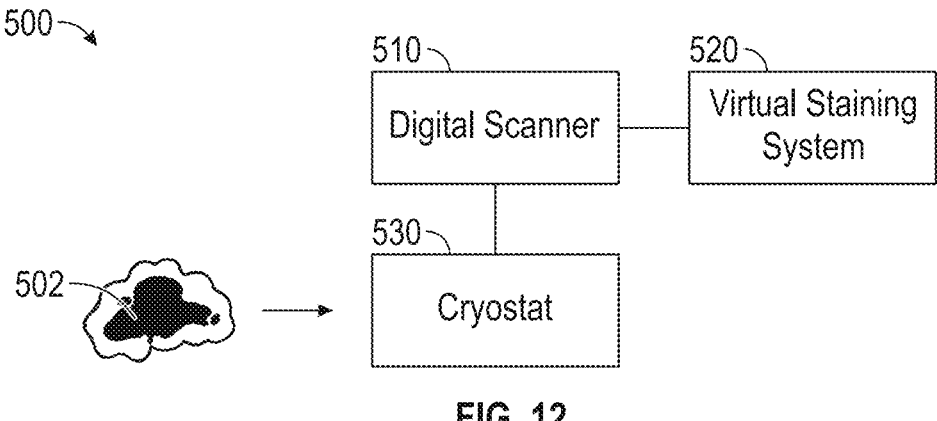
FIG. 12 illustrates a simplified drawing of another system for creating a virtual histological stained image from an unstained tissue sample, and shown as employed with the unstained tissue sample, in accordance with one non-limiting embodiment of the disclosed concept.

FIG. 12 shows another system 500 for creating a virtual histological stained image from an unstained tissue sample 502, and is configured similar to the system 400 (FIG. 11), such that like components have like numbers (e.g., digital scanner 510 and virtual staining system 520). However, as shown in FIG. 12, the system 500 further includes a cryostat 530 associated with the digital scanner 510 and configured to receive and cryosection the unstained tissue sample 502.

In one example, the cryostat 530 may be configured to trim and face the unstained tissue sample 502 as a frozen tissue block, cut sections of a predetermined and relatively small thickness (e.g., without limitation, less than 20 micrometers in one example, less than 10 micrometers in a more particular example, and between 3-6 micrometers in an even more particular example), ensure consistent section thickness for optimal image quality, and collect ribbon/sections carefully in order to avoid folding or tearing.

Additionally, it is contemplated that the cryostat 530 of the system 500 may allow for the disposing of cryosections onto vehicles (e.g., without limitation, positively charged slides), and also allow for sections to be air-dried or briefly warmed up to improve adherence. It will, however, be appreciated that negatively charged vehicles may also function with the cryostat 530. Digital vehicle scanning, accessing of virtual staining software, and virtual staining via the digital scanner 510 and virtual staining system 520 may all be performed in a similar manner as such steps are performed by the digital scanner 410 (FIG. 11) and the virtual staining system 420 (FIG. 11) of the system 400 (FIG. 11). Moreover, virtual staining via the virtual staining system 520 may also include uploading digitized cryosection images into virtual staining software of the virtual staining system 520. Furthermore, it is also contemplated that the digital scanner 510, the virtual staining system 520, and the cryostat 530 may all be a single unitary device with a common operating system (e.g., a common processor or processors to perform instructions (e.g., corresponding to the method 202 in FIG. 4) stored in a common memory).

It will be understood that the abovementioned arrangements of apparatus are merely illustrative of applications of the principles of this invention and many other embodiments and modifications may be made without departing from the spirit and scope of the invention as defined in the claims.

What is claimed is:

1. A method, comprising:
   providing a first predetermined number of unstained tissue samples and a second predetermined number of stained tissue samples;
   generating a first number of brightfield digital images of the first predetermined number of unstained tissue samples;
   generating a second number of brightfield digital images of the second predetermined number of stained tissue samples;
   generating a plurality of paired patches of the first number of brightfield digital images and the second number of brightfield digital images; and
   training a machine learning model with the plurality of paired patches by learning feature embeddings between the first number of brightfield digital images and the second number of brightfield digital images in order to digitally create at least one virtual histological stained image from an algorithm.

2. The method according to claim 1, wherein the machine learning model is a neural network system, and wherein training further comprises testing the neural network system with the plurality of paired patches in order to assess performance of the neural network system on unseen data.

3. The method according to claim 2, further comprising merging the plurality of paired patches using alpha blending in order to create the at least one virtual histological stained image.

4. The method according to claim 1, further comprising employing a scale invariant transformation to identify key points from a first image of the first number of brightfield digital images and a second image of the second number of brightfield digital images.

5. The method according to claim 4, wherein employing the scale invariant transformation further comprises matching the key points of the first image to the key points of the second image in order to calculate a Homography matrix.

6. The method according to claim 5, wherein employing the scale invariant transformation further comprises applying the Homography matrix to the first image in order to register the first image with the second image and create a set of data.

7. The method according to claim 6, wherein training the machine learning model further comprises using the set of data to learn nonlinear data mapping between tissue in the first predetermined number of unstained tissue samples and the second predetermined number of stained tissue samples.

8. The method according to claim 6, wherein the key points of the first image and the key points of the second image comprise nuclei.

9. The method according to claim 1, wherein training the machine learning model further comprises employing at least one encoder and at least one projection head with each of a first domain corresponding to the first predetermined number of unstained tissue samples and a second domain corresponding to the second predetermined number of stained tissue samples in order to bridge a gap between the first and second domains.

10. The method according to claim 9, further comprising employing a first generator for mapping the first domain to the second domain.

11. The method according to claim 10, further comprising employing a second generator for learning an inverse mapping of the second domain to the first domain.

12. The method according to claim 11, further comprising employing at least one discriminator in order to ensure that first images of the first number of brightfield digital images and second images of the second number of brightfield digital images belong to the first and second domains, respectively, while the first and second generators are being employed.

13. The method according to claim 1, wherein the machine learning model is a neural network system, and wherein training the machine learning model comprises employing cycle consistency by performing a calculation of a first digital difference between one of the second number of brightfield digital images and the at least one virtual histological stained image.

14. The method according to claim 13, wherein training the neural network system further comprises employing the cycle consistency by performing another calculation of a second digital difference between the at least one virtual histological stained image and the one of the second number of brightfield digital images, in order to cause the at least one histological stained image to be identical to the one of the second number of brightfield digital images.

15. The method according to claim 1, wherein providing the first predetermined number of unstained tissue samples and the second predetermined number of stained tissue samples further comprises preprocessing the first predetermined number of unstained tissue samples in order to remove background via adaptive thresholding.

16. The method according to claim 1, wherein the machine learning model is a dual contrastive learning general adversarial network (GAN) model.

17. The method according to claim 16, further comprising employing the dual contrastive learning GAN model to learn a correspondence between the first number of brightfield digital images and the second number of brightfield digital images using separated embeddings.

18. The method according to claim 16, further comprising applying contrastive learning with the dual contrastive learning GAN model by applying a noise contrastive estimation framework.

19. The method according to claim 1, wherein training the machine learning model is further performed in order to allow for diagnosis by a computerized machine.

* * * * *